US007342327B2

(12) United States Patent
Janning

(10) Patent No.: US 7,342,327 B2
(45) **Date of Patent: *Mar. 11, 2008**

(54) SERIES CONNECTED LIGHT STRING WITH FILAMENT SHUNTING

(75) Inventor: John L. Janning, Dayton, OH (US)

(73) Assignee: JLJ, Inc., Bellbrook, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/542,184

(22) Filed: Oct. 4, 2006

(65) Prior Publication Data

US 2007/0029937 A1 Feb. 8, 2007

Related U.S. Application Data

(60) Continuation of application No. 11/283,717, filed on Nov. 22, 2005, which is a continuation of application No. 10/891,094, filed on Jul. 15, 2004, now Pat. No. 7,042,116, which is a continuation of application No. 10/364,526, filed on Feb. 12, 2003, now Pat. No. 6,765,313, which is a continuation of application No. 10/061,223, filed on Feb. 4, 2002, now Pat. No. 6,582,182, which is a continuation of application No. 09/526,519, filed on Mar. 16, 2000, now abandoned, which is a division of application No. 08/896,278, filed on Jul. 7, 1997, now abandoned, which is a continuation of application No. 08/653,979, filed on May 28, 1996, now abandoned, which is a continuation-in-part of application No. 08/560,472, filed on Nov. 17, 1995, now abandoned, which is a continuation-in-part of application No. 08/494,725, filed on Jun. 26, 1995, now abandoned.

(51) Int. Cl.
*H02J 1/00* (2006.01)

(52) U.S. Cl. ........................................................ 307/36

(58) Field of Classification Search .................. 307/36
See application file for complete search history.

(56) References Cited

U.S. PATENT DOCUMENTS 1,024,495 A 4/1912 Booth (Continued)

FOREIGN PATENT DOCUMENTS

CH 427021 12/1966

(Continued)

OTHER PUBLICATIONS

Buchsbaum, Walter, H. Buchsbaum's Complete handbook of Practical Electronic Reference Data, Copyright 1978, 1973. pp. 182-186, Fig. 8-6 entitled "Zener diode characteristics".

*Primary Examiner*—Robert L. Deberadinis
(74) *Attorney, Agent, or Firm*—Dickstein Shapiro LLP

(57) ABSTRACT

A string set of series-connected incandescent bulbs in which substantially all of the bulb filaments in the set are individually provided with a shunt circuit which includes a voltage responsive switch which is inoperative during normal operation of the string set when connected to a source of operating potential and which becomes operative only in response to an increase in the voltage thereacross which exceeds its rating, and in which the remaining bulbs of the circuit continue to receive substantially rated current therethrough and substantially rated voltage thereacross and further continue to be illuminated at substantially constant illumination even though other or substantially all of the other bulbs in the string are either inoperative or are missing from their respective sockets. If flasher bulbs are used in the string, they will twinkle off and on when the operating potential is applied.

2 Claims, 3 Drawing Sheets

U.S. PATENT DOCUMENTS

| | | | | |
|---|---|---|---|---|
| 1,809,673 | A | | 6/1931 | Butler |
| 1,868,689 | A | | 7/1932 | Brander |
| 2,053,574 | A | * | 9/1936 | Nothstine .................... 315/72 |
| 2,072,337 | A | | 3/1937 | Kamm |
| 2,760,120 | A | | 8/1956 | Fisherman |
| 3,345,482 | A | | 10/1967 | Lou |
| 3,535,585 | A | | 10/1970 | Barnum |
| 3,639,805 | A | | 2/1972 | Muench et al. |
| 3,912,966 | A | | 10/1975 | Harnden, Jr. |
| 4,450,382 | A | | 5/1984 | Sawka et al. |
| 4,631,650 | A | | 12/1986 | Ahroni |
| 4,653,084 | A | | 3/1987 | Ahuja |
| 4,675,575 | A | | 6/1987 | Smith et al. |
| 4,682,079 | A | | 7/1987 | Sanders |
| 4,725,760 | A | * | 2/1988 | Fang ........................... 315/73 |
| 4,727,449 | A | * | 2/1988 | Fleck .......................... 361/54 |
| 4,985,001 | A | * | 1/1991 | Nagai ......................... 439/527 |
| 5,006,724 | A | | 4/1991 | Liu |
| 5,111,058 | A | | 5/1992 | Martin |
| 5,243,510 | A | | 9/1993 | Chenny, II |
| RE34,717 | E | | 9/1994 | Sanders |
| 5,379,214 | A | | 1/1995 | Arbuckle et al. |
| 5,453,664 | A | * | 9/1995 | Harris .................... 315/185 S |
| 5,777,868 | A | | 7/1998 | Gibboney, Jr. |
| 5,886,423 | A | | 3/1999 | Gershen et al. |
| 6,084,357 | A | | 7/2000 | Janning |
| 6,283,797 | B1 | | 9/2001 | Wu |
| 6,323,597 | B1 | | 11/2001 | Janning |
| 6,344,716 | B1 | | 2/2002 | Gibboney, Jr. |
| 6,373,199 | B1 | | 4/2002 | Erhardt et al. |
| 6,580,182 | B2 | | 6/2003 | Janning |
| 6,765,313 | B2 | | 7/2004 | Janning |

FOREIGN PATENT DOCUMENTS

| | | |
|---|---|---|
| DE | 19841490 A1 | 3/2000 |
| EP | 0 284 592 | 9/1988 |
| FR | 2 602 115 | 1/1988 |
| FR | 2 663 183 | 12/1991 |
| JP | 50-43092 | 12/1975 |
| JP | 60-88499 | 6/1985 |

* cited by examiner

SERIES CONNECTED LIGHT STRING WITH FILAMENT SHUNTING

CROSS-REFERENCE TO RELATED APPLICATIONS

This is a continuation of application Ser. No. 11/283,717, filed Nov. 22, 2005, which is a continuation of U.S. Ser. No. 10/891,094, filed Jul. 15, 2004, now U.S. Pat. No. 7,042,116, which is a continuation of application Ser. No. 10/364,526, filed Feb. 12, 2003, now U.S. Pat. No. 6,765,313, which is a continuation of application Ser. No. 10/061,223, filed Feb. 4, 2002, now U.S. Pat. No. 6,580,182, which is a continuation of application Ser. No. 09/526,519, filed Mar. 16, 2000, now abandoned, which is a division of application Ser. No. 08/896,278, filed Jul. 7, 1997, now abandoned, which is a continuation of application Ser. No. 08/653,979, filed May 28, 1996, now abandoned, which is a continuation-in-part of application Ser. No. 08/560,472, filed Nov. 17, 1995, now abandoned, which is a continuation-in-part of application Ser. No. 08/494,725, filed Jun. 26, 1995, now abandoned.

BACKGROUND OF THE INVENTION

One of the most common uses of light strings is for decoration and display purposes, particularly during Christmas and other holidays, and more particularly for the decoration of Christmas trees, and the like. Probably the most popular light set currently available on the market, and in widespread use, comprises one or more strings of fifty miniature light bulbs each, with each bulb typically having an operating voltage rating of 2.5 volts, and whose filaments are connected in an electrical series circuit arrangement. If overall sets of more than fifty bulbs are desired, the common practice is to provide a plurality of fifty miniature bulb strings, with the bulbs in each string connected in electrical series, and with the plurality of strings being connected in a parallel circuit arrangement. As each bulb of each string is connected in series, when a single bulb fails to illuminate for any reason, the whole string fails to light and it is very frustrating and time consuming to locate and replace a defective bulb or bulbs. Usually many bulbs have to be checked before finding the failed bulb. In fact, in many instances, the frustration and time consuming efforts are so great as to cause one to completely discard and replace the string with a new string before they are even placed in use. The problem is even more compounded when multiple bulbs simultaneously fail to illuminate for multiple reasons, such as, for example, one or more faulty light bulbs, one or more unstable socket connections, or one or more light bulbs physically fall from their respective sockets, and the like.

There are presently available on the market place various devices and apparatuses for electrically testing an individual light bulb after it has been physically removed from its socket. Apparatus is also available on the market for testing Christmas tree light bulbs by physically placing an alternating current line voltage sensor in close proximity to the particular light bulb desired to be tested. However, such a device is merely an electromagnetic field strength detection device which many remain in an "on" condition whenever the particular Christmas tree light bulb desired to be tested is physically located in close proximity to another light bulb or bulbs on the Christmas tree.

In fact, light bulb manufacturers have also attempted to solve the problem of bad bulb detection by designing each light bulb in the string in a manner where by the filament in each light bulb is shorted whenever it burns out for any reason, thereby preventing an open circuit condition to be present in the socket of the burned-out bulb. However, in actual practice, it has been found that such short circuiting feature within the bulb does not always operate in the manner intended and the entire string will go out whenever a single bulb burns out.

In U.S. Pat. No. 5,539,317, entitled CIRCUIT TESTER FOR CHRISTMAS TREE LIGHT SETS and filed on Nov. 7, 1994 by the same applicant as the instant application, there is disclosed therein a novel, hand held and battery operated device which is capable of testing each light bulb in a string without the necessity of removing the bulb from its socket, thereby readily locating the burned out bulb which caused the entire string of bulbs to go out.

Even though each of the foregoing techniques have met with some limited success, none of such devices and techniques have yet been able to further solve the additional problems of the entire string of lights going out as a direct result of either a defective socket, a light bulb being improperly placed in the socket, a broken or bent wire of a light bulb, or whenever a light bulb is either intentionally removed from its socket or is merely dislodged from its socket during handling or from movement after being strung on the Christmas tree, particularly in outdoor installations subject to wind or other climatic conditions.

U.S. Pat. No. 4,450,382 utilizes a Zener diode connected in parallel with each series connected direct-current lamp used by trucks and other vehicles, particularly military trailers, for burn-out protection for the remaining bulbs whenever one or more bulbs burns out for some reason. It is stated therein that the use of either a single or a plurality of parallel connected Zener diodes will not protect the lamps against normal failure caused by normal current flows, but will protect against failures due to excessive current surges associated with the failure of associated lamps. No suggestion appears therein of any mechanism or technique which would provide a solution to the problem successfully achieved by applicant in a very simple and economical manner.

Various other attempts have heretofore been made to provide various types of shunts in parallel with the filament of each bulb, whereby the string will continue to be illuminated whenever a bulb has burned out, or otherwise provides an open circuit condition. However, to the knowledge of Applicant, none of such arrangements have ever become commercially feasible.

Typical of such arrangements are found in U.S. Pat. Nos. RE 34,717; 1,024,495; 2,072,337; 2,760,120; 3,639,805; 3,912,966; 4,450,382; 4,682,079; 4,727,449; 5,379,214; and 5,006,724, together with Swiss patent 427,021.

Of the foregoing prior art patents, the Fleck '449, Hamden '966, and the Swiss '021 patents appear, at first blush, to probably be the most promising in the prior art in indicating defective bulbs in a string by the use of filament shunt circuits and/or devices of various types which range from polycrystalline materials, to powders, and to metal oxide varistors, and the like, which provide for continued current flow through the string, but at either a higher or a lower level. The reason for this is because of the fact that the voltage drop occurring across each prior art shunt is substantially different value than the value of the voltage drop across the incandescent bulb during normal operation thereof. Some of these prior art shunts cause a reduced current flow in the series string because of too high of a voltage drop occurring across the shunt when a bulb becomes inoperable, either due to an open filament, a faulty bulb, a faulty socket, or simply because the bulb is not mounted properly in the socket, or is entirely removed or falls from its respective socket. However, other shunt devices cause the opposite effect due to an undesired increase in current flow. For example, when the voltage dropped across a socket decreases, then a higher voltage is applied to all of the remaining bulbs in the string, which higher voltage results in higher current flow and a decreased life expectancy of the remaining bulbs in the string. Additionally, such higher voltage also results in increased light output from each of the remaining bulbs in the string, which may not be desirable in some instances. However, when the voltage dropped across a socket increases, then a lower voltage is applied to all of the remaining bulbs in the series connected string, which results in lesser current flow and a corresponding decrease in light output from each of the remaining bulbs in the string. Such undesirable effect occurs in all of the prior art attempts, including those which, at first blush, might be considered the most promising techniques, especially the proposed use of a diode in series with a bilateral switch in the Fleck '449 patent, or the proposed use of a metal oxide varistor in the above Harnden '966 patent, or the use of the proposed counter-connected rectifiers in the Swiss '021 patent.

For example, in the arrangement suggested in the above Fleck '449 patent, ten halogen filled bulbs, each having a minimum 12-volt operating rating, are utilized in a series circuit. The existence of a halogen gas in the envelope, permits higher value current flow through the filament with the result that much brighter light is obtainable in a very small bulb size. Normally, when ten 12-volt halogen bulbs are connected in a series string, the whole string goes dark whenever a single bulb fails and does not indicate which bulb had failed. To remedy this undesirable effect, Fleck provided a bypass circuit across each halogen filled bulb which comprised a silicon bilateral voltage triggered switch in series with a diode which rectifies the alternating current (i.e., "A.C.") supply voltage and thereby permits current to flow through the bilateral switch only half of the time, i.e., only during each half cycle of the A. C. supply voltage. It is stated in Fleck that when a single bulb burns out, the remaining bulbs will have "diminished" light output because the diode will almost halve the effective voltage due to its blocking flow in one direction and conduction flow only in the opposite direction. Such substantially diminished light output will quite obviously call attention to the failed bulb, as well as avoid the application of a greater voltage which would decrease the life of the remaining filaments. However, in actual practice, a drastic drop in brightness has been observed, i.e. a drop from approximately 314 lux to approximately 15 lux when one bulb goes out. Additionally, it is stated by the patentee that the foregoing procedure of replacing a burned out bulb involves the interruption of the application of the voltage source in order to allow the switch to open and to resume normal operation after the bulb has been replaced. (See column 2, lines 19-22.) Additionally, as such an arrangement does not permit more that one bulb to be out at the same time, certain additional desirable special effects such as "twinkling", and the like, obviously would not be possible.

In the arrangement suggested in Harnden '966 patent, Harden proposes to utilize a polycrystalline metal oxide varistor as the shunting device, notwithstanding the fact that it is well known that metal oxide varistors are not designed to handle continuous current flow therethrough. Consequently, they are merely a so-called "one shot" device for protective purposes, i.e. a transient voltage suppressor that is intended to absorb high frequency or rapid voltage spikes and thereby preventing such voltage spikes from doing damage to associated circuitry. They are designed for use as spike absorbers and are not designed to function as a voltage regulator or as a steady state current dissipation circuit. While metal oxide varistors may appear in some cases similar to back-to-back Zener diodes, they are not interchangeable and function very differently according to their particular use. In fact, the assignee of the Harnden '966 patent which was formerly General Electric Corporation and now is apparently Harris Semiconductor, Inc., states in their Application Note 9311: "They are exceptional at dissipating transient voltage spikes but they cannot dissipate continuous low level power." In fact, they further state that their metal oxide varistors cannot be used as a voltage regulator as their function is to be used as a nonlinear impedance device. The only similarity that one can draw from metal oxide varistors and back-to-back Zener diodes is that they are both bidirectional; after that, the similarity ends.

In the Swiss '021 patent, Dyre discloses a bilateral shunt device having a breakdown voltage rating that, when exceeded, lowers the resistance thereof to 1 ohm or less. This low value of resistance results in a substantial increase in the voltage being applied to the remaining bulbs even when only a single bulb is inoperative for any of the reasons previously stated. Thus, when multiple bulbs are inoperative, a still greater voltage is applied to the remaining bulbs, thereby again substantially increasing their illumination, and consequently, substantially shortening their life expectancy.

In contrast, by utilizing a shunt of the type proposed by Applicant, substantially all of the bulbs in a 50 bulb string can become inoperative for any or all of the reasons previously stated, with only a minimal decrease in intensity of illumination of the remaining bulbs, which is not possible with any of the foregoing shunts. Additionally, and of particular significance, is the fact that the Swiss '021 teaching has now been available to those skilled in the art for over 30 years, that the Harnden '966 has additionally been available for over 20 years, and, the Fleck '449 teaching has still additional been available for over 8 years, and yet none of such teachings, either singly of collectively, have found their way to commercial application. In fact, miniature Christmas tree types lights now rely solely upon a specially designed bulb which is supposed to short out when becoming inoperative. Obviously, such a scheme is not always effective, particularly when a bulb is removed from its socket or becomes damaged in handling, etc. The extent of the extreme attempts made by others to absolutely keep the bulbs from falling from their sockets, includes the use of a locking groove formed on the inside circumference of the socket mating with a corresponding raised ridge formed on the base of the bulb base unit. While this particular locking technique apparently is very effective to keep bulbs from falling from their respective sockets, the replacement of defective bulbs by the average user is extremely difficult, if not sometimes impossible, without resorting to mechanical gripping devices which can actually destroy the bulb base unit or socket.

SUMMARY OF THE INVENTION

In accordance with this invention, there is provided a novel filament shunting circuit for use in connection with a series connected string of incandescent light bulbs which completely overcomes in a very simple, novel and economical manner the problems heretofore associated with prior arrangements which were primarily designed to merely maintain some sort of current flow through the entire string of bulbs whenever one or more bulbs in the string becomes inoperable, either due to an open filament, one or more faulty bulbs, one or more faulty sockets, or simply because one or more of the bulbs are not properly mounted in their respective sockets, or are entirely removed or fall from their respective sockets.

In accordance with the present invention, there is provided a series string of incandescent light bulbs, each having a silicon type shunting device connected thereacross which has a predetermined voltage switching value which is greater than the voltage normally applied to said bulbs, and which shunt becomes fully conductive only when the peak voltage applied to said bulbs, and which shunt becomes fully conductive only when the peak voltage applied thereacross exceeds its said predetermined voltage switching value, which occurs whenever a bulb in the string either becomes inoperable due to any one or more or all of the following reasons: an open filament, faulty or damaged bulb, faulty socket, or simply because the bulb is not properly mounted in its respective socket, or is entirely removed or falls from its respective socket, and which circuit arrangement provides for the continued flow of rated current through all of the remaining bulbs in the string, together with substantially unchanged illumination in light output from any of those remaining operative in the string even though a substantial number of total bulbs in the string are simultaneously inoperative for any combinations of the various reasons heretofore stated.

It is therefore a principal object of the present invention to provide a simple and inexpensive silicon type filament shunt, or bypass, for each of a plurality of series connected light bulbs, said filament shunt having a predetermined conductive switching value which is only slightly greater than the voltage rating of said bulbs, and which shunt becomes conductive whenever the peak voltage applied thereacross exceeds its said predetermined voltage switching value, which would occur for any of the reasons previously stated, and which provides continued and uninterrupted flow of rated current through each of the remaining bulbs in the string, together with substantially unchanged illumination in light output therefrom.

It is another object of the present invention to provide a new and improved series-connected light bulb string which has the desirable features set forth above, and yet is of very simple and economical construction and is relatively inexpensive to manufacture in mass quantities, thereby keeping the overall cost of the final product on the marketplace at a minimum, and which does not necessitate any type of bulb which is specially designed to provide a short circuit whenever it burns out, as is presently the case in substantially all strings on the market.

DESCRIPTION OF THE PREFERRED EMBODIMENT

Figure 1:
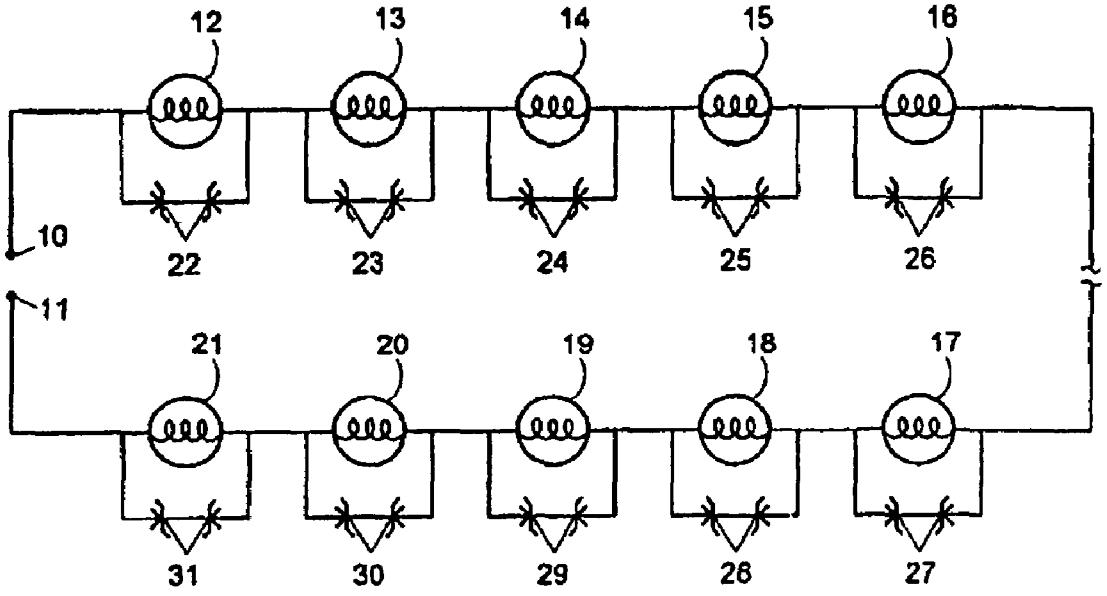
FIG. 1 is an electrical schematic diagram of a novel light string constructed in accordance with a first embodiment of the present invention.

With reference to the schematic diagram in FIG. 1, the novel light string constructed in accordance with the first embodiment of the present invention comprises input terminals 10 and 11 which are adapted to be connected to a suitable source of supply Of 110/120 volts of alternating current normally found in a typical household or business. Terminal 10 is normally fixedly connected to the first terminal of the first socket having a first electrical light bulb 12 operatively plugged therein. The adjacent terminal of the first socket is electrically connected to the adjacent terminal of the second socket having a second light bulb 13 operatively plugged therein, and so on, until each of the light bulbs in the entire string (whether a total of 10 bulbs, as diagrammatically shown, or a total of 50 as is typically the case) are finally operatively connected in an electrical series circuit between input terminals 10 and 11. Operatively connected in an electrical parallel across the electrical terminals of the first socket, hence the electrical terminals of first light bulb 12, is a first voltage sensitive switch 22 which is symbolically illustrated and which effectively functions as a first voltage regulating device in the manner hereinafter described. Likewise, operatively connected in electrical parallel across the electrical terminals of the second socket, hence second light bulb 13, is a second voltage sensitive switch 23 which likewise effectively functions as a voltage regulating device, and so on, until each of the remaining sockets, and hence each of remaining light bulb 14 through 21 of the series has a corresponding one of voltage sensitive switches 24 through 31 operatively connected in parallel thereacross.

For practical purposes, it is preferred that all voltage responsive switches 22 through 31 be of identical construction and ideally would have a characteristic, such that, when conductive, i.e. in an "on" or "closed" condition, the impedance thereof have a value equal to the impedance of the filament of the corresponding light bulb and, when nonconductive, i.e. in an "of" or "open" condition, the value of the impedance thereof would be equal to infinity.

It has been found that, when two well-known semiconductive devices known as "Zener" diodes are connected back-to-back (i.e. in an inverse electrical series connection), they provide the desirable characteristics for an excellent voltage responsive switch which essentially functions as a voltage regulating device in accordance with the present invention, particularly since such back-to-back Zener diodes are readily available in the market place at relatively low cost, and more particularly when purchased in relatively large quantities. The mode of operation of the embodiment of FIG. 1 is as follows:

Assuming the light string is a typical 50 light string containing 50 lamps connected in electrical series, and with each lamp having a voltage rating of 2.4 volts. the effective voltage rating for the entire string would be determined by multiplying 50 times 2.4 volts, which resultant product equals 120 volts. By electrically connecting two Zener diodes in a back-to-back inverse-series connection, with each having a voltage rating of 3.3 volts, across each lamp (which Zener diodes may both be constructed within the socket itself), the voltage across each individual lamp, with 200 milliamperes of current flow, cannot increase beyond approximately 4.5 volts. When a lamp is illuminated (or "on") in the string, the voltage across that particular lamp is approximately 2.4 volts (or approximately 3.4 volts, peak value), depending, of course, on the value of the applied line voltage at that particular time. With two Zener diodes, each having a voltage rating of 3.3 volts connected in a back-to-back configuration across each lamp, substantially no current flows through either of the Zener diodes, and substantially all of the current flows through each series connected lamp. When a lamp is removed from its respective socket or burns out, or the like, and there is no shorting mechanism within the lamp, the voltage across that particular lamp begins to rise toward the value of the applied line voltage. However, with the two 3.3 volt Zener diodes connected back-to-back across that particular lamp, the voltage thereacross can only rise to approximately 4.5 volts before both Zener diodes begin conduction. This is only approximately 1.1 volts (peak) more than was dropped across the respective socket when the corresponding lamp was conducting. The remaining lamps in the string are little affected by the extra 1.1 volt (peak) drop occurring in the Zener circuit. The voltage across each remaining lamp in the string is lowered by a mere approximately 23 millivolts (peak). Thus, substantially no current flows in the shunting mechanism until it is needed.

Figure 5:
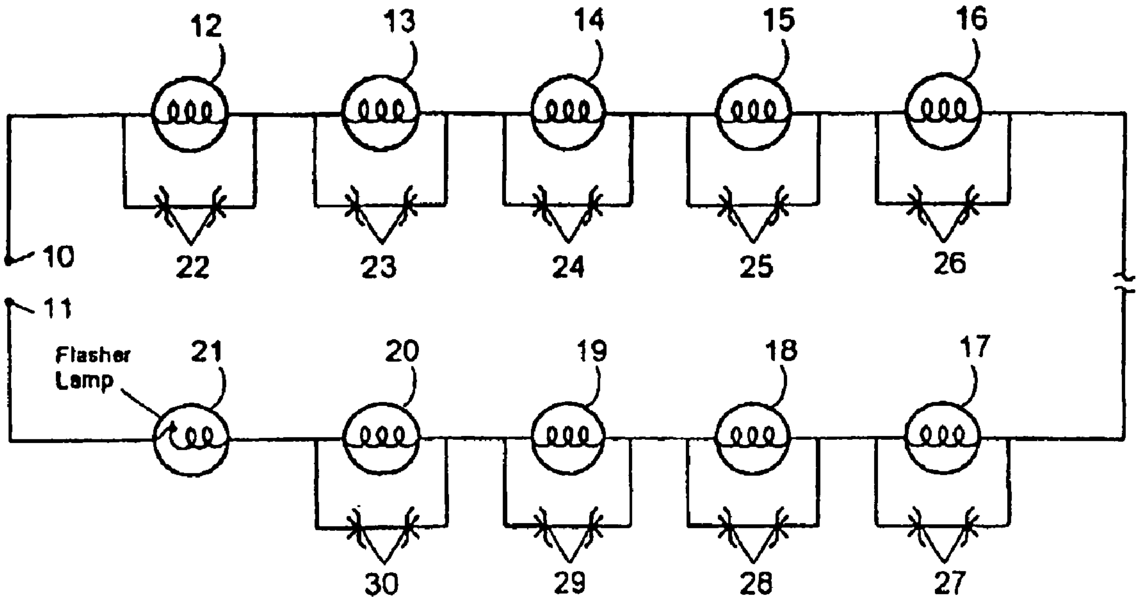
FIG. 5 is an electrical schematic diagram of a novel light string constructed in accordance with still another embodiment of the present invention; and, FIG. 6 is an electrical schematic diagram of a novel light string constructed in accordance with still another embodiment of the present invention.
Figure 6:
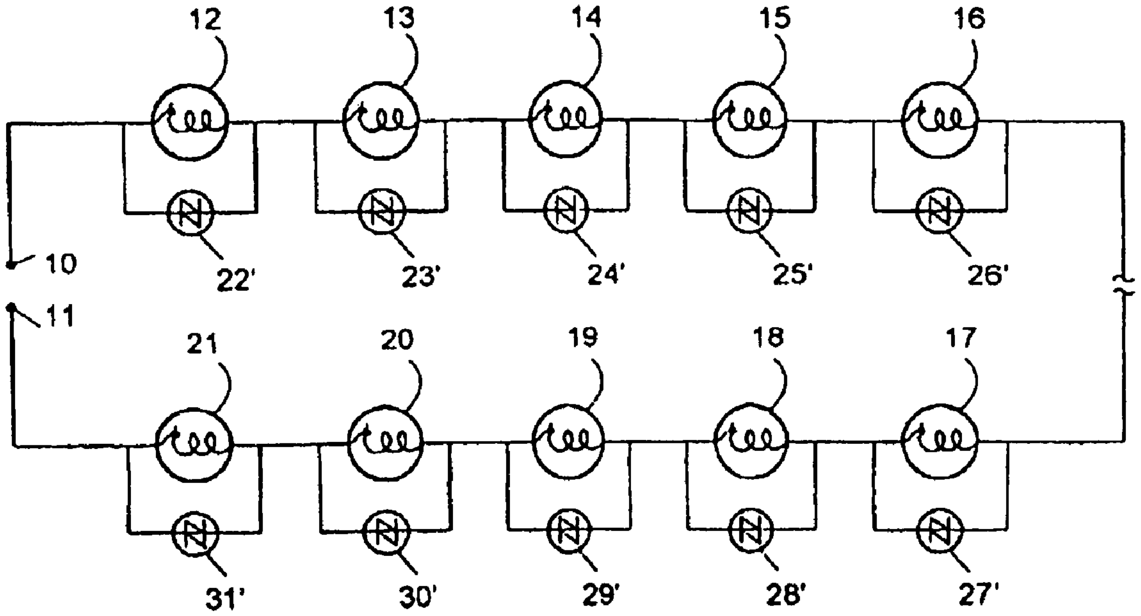

The unusual and desirable characteristics of the foregoing embodiment over prior art light strings is the fact that the string continues to stay lit, regardless of whether one or more of the light bulbs in the string burns out, falls out of their respective sockets, or are loose or are inserted crooked in their respective sockets. The string stays lit no matter what happens to one or more light bulbs in the string. Thus, the back-to-back Zener diodes insure that current will continue to flow in the series-wired circuit, regardless of what happens to the particular light bulb across which it is shunted. However, if it is desired to insert a standard "flasher" bulb in one of the sockets, as is customarily done, whereby the entire light string will go on and off each time the flasher bulb changes state, it is necessary to omit a Zener diode pair from across one of the sockets, preferably one of the sockets nearest the A.C. plug, and then insert the flasher bulb in that particular socket as diagrammatically illustrated in FIG. 5. Thereafter, the string will flash on and off in a normal manner.

It should be recognized and appreciated that, when it was stated above that the voltage rating of each Zener diode is 3.3 volts, this means that the Zener diode will begin conducting in the reverse direction whenever the voltage across that particular Zener diode first reaches 3.3 volts. Conversely, when the Zener diode is conducting in the forward direction, there is an approximately 0.7 volt drop across that particular Zener diode. Thus, when two such Zener diodes are electrically connected in a back-to-back configuration, the effective voltage breakdown rating of the pair (hereinafter "effective voltage rating") is approximately 4.0 volts (i.e., 3.3 volts plus 0.7 volts) because one Zener diode in a pair is conducting in a forward direction and the other Zener diode in the pair is conducting in the reverse direction. Thus, the pair is polarity symmetrical, i.e., the same in both directions. This 4.0 voltage value will increase as more current flows through the back-to-back pair, until a current flow of approximately 200 milliamperes is flowing therethrough, i.e., the average current in a 50 bulb string, at which time the voltage dropped across the two 3.3 volt rated back-to-back Zener diodes reaches approximately 4.4 volts. Such back-to-back Zener diodes are commercially available from ITT Semiconductor Company as their DZ89 Series "dual Zeners". Various voltage ratings are available and which ratings are usually expressed in terms of peak voltage values, or sometimes the A.C. rating.

Each back-to-back Zener diode pair, or dual Zeners, is prevented from destroying itself as a result of the well-known "current runaway" condition, due to the current limiting effect by the remaining series connected lamps in the string whose total resistance value determines the magnitude of the current flowing therethrough. If, for example, all of the lamps are removed from the string, the supply voltage of 120 volts (A.C.), or 170 volts (peak) appears across the 50 shunts. With each back-to-back Zener diode shunt effectively rated at 4.0 volts (peak), there is little or no current conduction in the string because only 3.4 volts (peak) is available to appear across each shunt.

Another preferred device is the bilateral silicon trigger switch (STS), which is currently available from Teccor Electronics, Inc., but is presently slightly more expensive than the back-to-back Zener type switch. Like the back-to-back Zener type switch the so-called "STS", type switches offer low breakover voltages. The devices switch from the blocking mode to a conduction mode when the applied voltage, of either polarity, exceeds the breakover (threshold) voltage and are not only bilateral but, like the back-to-back Zener diodes, are also very symmetrical for alternating current applications. As schematically illustrated in FIG. 2, each of the illustrated bilateral silicon trigger switches 22' through 31' is respectively connected in parallel with a corresponding one of series connected light bulbs 12 through 21 in the same manner as previously illustrated in FIG. 1.

Figure 2:
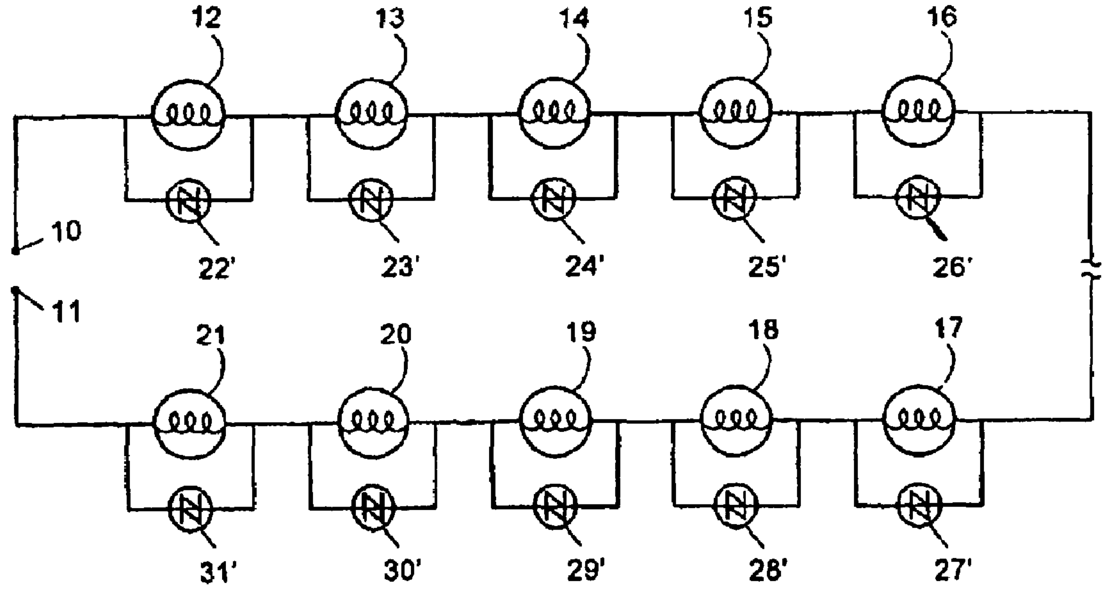
FIG. 2 is electrical schematic diagram of a novel light string constructed in accordance with a further embodiment of the present invention.

The mode of operation of the silicon trigger switch embodiment shown in FIG. 2 is substantially the same as that of the back-to-back Zener diode embodiment shown in FIG. 1. However, in the STS embodiment, substantially the same voltage drop of approximately 2.4 volts again appears across each light socket of a 50 miniature light string whenever the STS is conductive. When an STS device is shunted across each socket, there is no conduction in the STS device until the corresponding light bulb burns out or is removed from its socket. When that happens, the voltage starts to rise to a threshold voltage at which the STS device switches from the "off" to the "on" state. In the "on" state, the voltage across the STS device in a 50 light string at 200 milliamperes, at which most 50 light strings operate, is approximately 2.4 volts, the same as it was when the respective light bulb was in its socket and operative. Thus, the voltage drop across each light bulb remains virtually unchanged, whether or not one or more of the remaining light bulbs in the string are operative.

Figure 3:
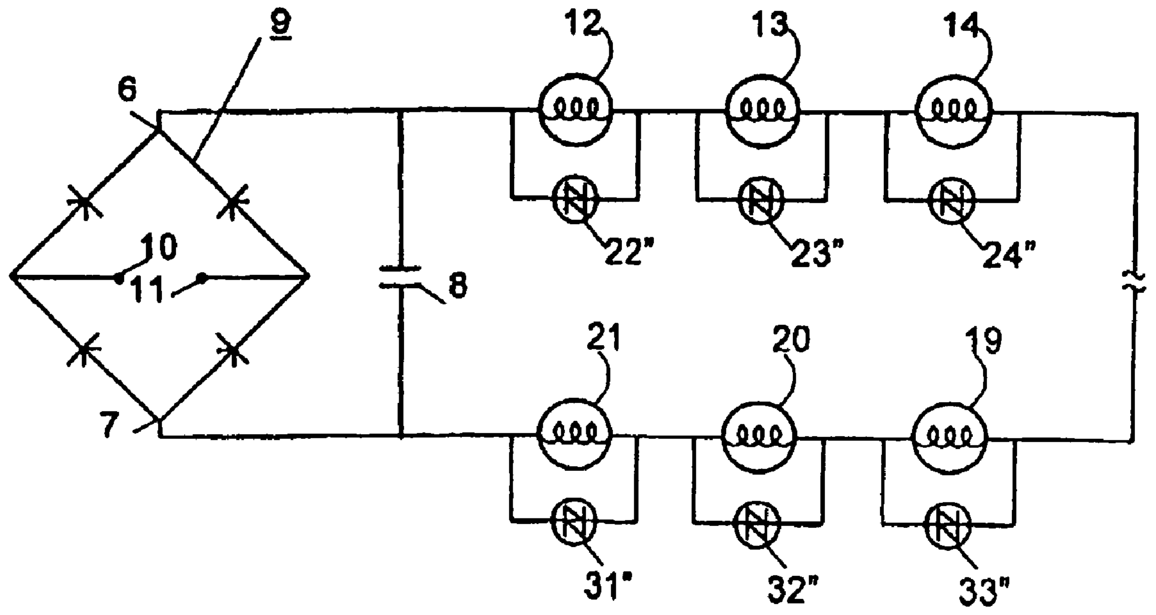
FIG. 3 is an electrical schematic diagram of a novel light string constructed in accordance with still another embodiment of the present invention.

The embodiment shown in FIG. 3, illustrates a circuit arrangement which operates substantially the same as the previous embodiments, with the exception that the source of operating voltage is a full wave rectified voltage which pulsates at twice the normal 60 cycle rate. As shown in FIG. 3, STS devices 22" through 31" are respectively shunted across light bulbs 12-21, which preferably comprises a 50 miniature bulb string. Preferably molded in the power cord socket is a full wave rectifier 9 which preferably has a 3.9 microfarad capacitor connected across terminals 6 and 7. As before indicated, the rectifier 9 and capacitor 8 can either be installed inside the A.C. plug or they can be in a separate adapter plug that the power cord plug is plugged into. This will apply pulsating and partially filtered direct current (i.e., "D.C.") to the string. If just a bridge rectifier by itself is used and the pulsating output voltage is not filtered, the string will function the same as if A.C. were used as the operating potential. This is because the STS device will go "off" and "on" 120 times a second, i.e., two times the A.C. rate. By installing a capacitor across the output of the bridge rectifier, there will be an improvement in performance. However, if capacitor 8 is too small, the lamp intensity will flicker, especially if flasher bulbs are mixed with regular bulbs in the string. Additionally, the current in the string will be too low. If too large of a capacitor is used, the current through the bulbs will be excessive and bulb life will be shortened. Therefore, the ideal capacitance is one where the current through the lamps is the normal 200 milliamperes in a typical 50 miniature light bulb string. At this level, current flow stabilizes and the string operates perfectly. In a 50 miniature bulb string, the preferred capacitance is approximately 3.3 to 4.7 microfarads. More capacitance will be needed when more bulbs are added.

Figure 4:
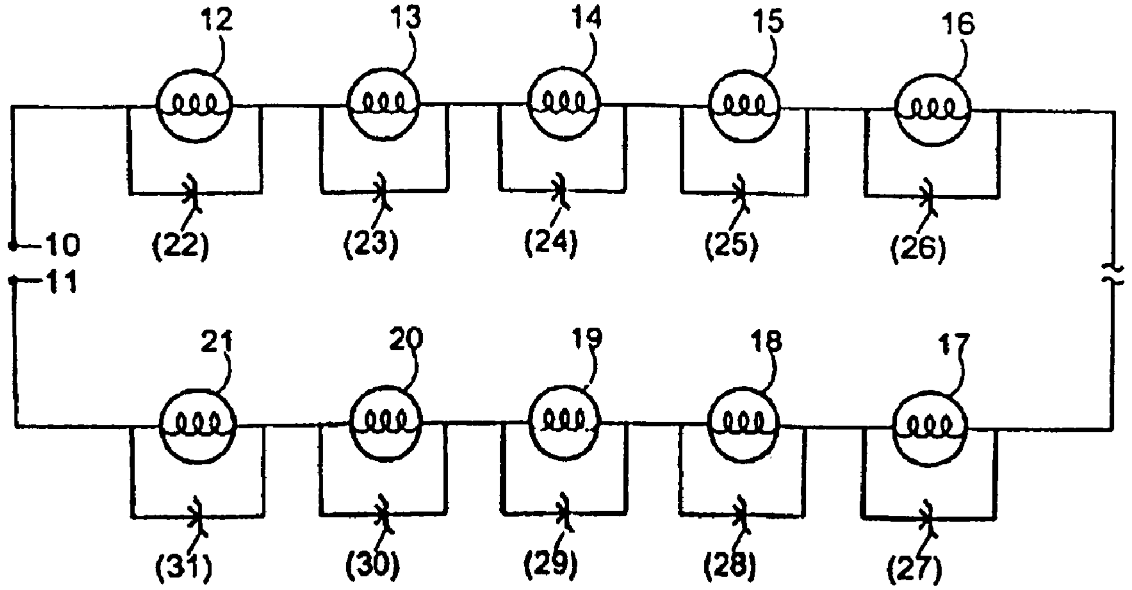
FIG. 4 is an electrical schematic diagram of a novel light string constructed in accordance with still another embodiment of the present invention.

In the further embodiment shown in FIG. 4, there is illustrated a circuit arrangement which operates substantially the same as the previously described embodiments, with the exception that only a single Zener diode is shunted across each bulb socket and that preferably one-half of the total number of Zener diodes in the circuit are functionally oriented in one predetermined direction, as illustrated by light bulbs 12 through 16, while the remaining half are functionally oriented in the opposite direction, as illustrated by light bulbs 17 through 21.

For illustrative purposes only, assuming the circuit shown in FIG. 4 (as in FIGS. 1-3) contains a total of 50 series-connected incandescent bulbs, only 10 of which are shown for illustrative purposes as 12 through 21, and that the incoming operating potential of approximately 120 volts rms A.C. which corresponds to a peak voltage of approximately 170 volts A.C. In this case, each bulb receives an average rms voltage of approximately 2.4 volts, or approximately 3.4 peak volts, if all of the bulbs are of the same rating, which is normally the case. With a 6.2 volt Zener diode shunted across each of the bulbs, with the first 25 shunts, represented by (22) through (26), having their respective polarities connected in one direction, as shown, and the remaining 25 shunts, represented as (27) through (31), having their respective polarities connected in the opposite direction, as shown, the average voltage drop across each bulb is approximately 120 divided by 50, or approximately 2.4 volts rms or 3.4 peak volts. This is because during one-half of the A.C. cycle of the input supply voltage, the first 25 shunts will be forward biased and approximately 0.7-0.8 peak volts will appear across each shunt for a total of approximately 17.5-20 volts peak dropped across the first 25 shunts. Bulbs placed in these particular sockets will each receive a voltage of approximately 0.7-0.8 peak volts during the first half cycle of the operating potential, thereby resulting in a momentary tendency to decrease in brightness output. However, this leaves the remaining voltage of approximately 150-152.5 peak volts of the A.C. supply of approximately 170 peak volts to be dropped across the remaining 25 shunts. This will result in a reversed bias of approximately 6.0-6.1 peak volts to be applied across each bulb during the said first half cycle of the A.C. operating potential, thereby resulting in a momentary tendency of the bulbs placed in particular corresponding sockets to increase in brightness output. During the next half cycle of the A.C. operating potential, the respective biasing condition is reversed, i.e., those bulbs receiving a forward bias of approximately 0.7-0.8 peak volts during the first half cycle will next receive a reverse bias of approximately 6.0-6.1 peak volts during the second half cycle, and vice versa for the remaining bulbs in the string.

Consequently, the average voltage dropped across each bulb during one complete positive and negative alternating cycle is approximately 3.4 peak volts, or 6.8 volts peak-to-peak which corresponds to the rating of the particular bulbs used in the series string. This is because, while the peak voltage in both cases are the same, the effective voltages are not. In the normal case, the wave form is sinusoidal, while in the Zener diode shunt case, the alternating wave form is one-half sine wave and one-half square wave. The half that is sine wave is approximately 6.2 volts (peak), while the remaining half is square wave, is approximately 0.7 volts (peak). The result is a difference in rms values but not in peak values. Therefore, the peak voltages are substantially the same but the rms voltages are not substantially the same. Such operation will result in a shortened bulb life, unless the incoming A. C. operating voltage is lowered or, alternatively, more bulbs are added to the series string. Theoretically, in order to operate at the conventional A.C. supply voltage of approximately 120 rms volts, which corresponds to approximately 170 peak volts, approximately one-third more bulbs should be added to the string in order for all bulbs in the string to be illuminated at a normal brightness level. With 50 bulbs rated at 2.4-2.5 volts, 170 milliamperes, are used in such a string, the string operates at a higher brightness level than normal. Adding more bulbs to the string or using lower current or higher voltage rated bulbs will bring the brightness down to more normal brightness levels. The number of bulbs in the string and/or the voltage and current rating of said bulbs can be adjusted to obtain the desired brightness level of the light string.

In operation, when but a single bulb becomes inoperative for any of the various reasons previously stated, except for internal shorting, there is a voltage drop across its corresponding Zener diode shunt of approximately 0.7-0.8 peak volts in the forward direction and approximately 6.2 peak volts in the reverse, or Zener direction, when 6.2 volt Zener diodes are chosen for shunts. Thus, in one complete cycle of the applied operating potential, the absolute value of the voltage across that particular bulb socket sequentially increases from approximately 0 volts, to approximately 6.2 peak volts, to approximately 0.7-0.8 peak volts, then back to approximately 0 volts, thereby averaging approximately 2.44 rms volts, substantially the same as the bulb rating. In fact, in a laboratory test, it was found that it was possible to remove 49 bulbs from a 50 bulb string and the sole remaining bulb continued to be illuminated, but with an estimated decrease in brightness of only approximately 50%.

In strings other than 50 bulbs wired in electrical series, it is only necessary to select the appropriate Zener diode rating to be used as shunts, and then electrically connect one-half in one direction and the remaining one-half in the opposite direction without regard and to which shunt, or series of shunts, is connected in a particular direction, so long as the overall relationship exists as described above. For example, it may be desirable from a manufacturing standpoint to merely alternate the shunt polarities. Further, for an odd number of bulbs in a string, such as a thirty-five bulb string for example, the polarities could be divided into two groups with 17 in one group and 18 in the remaining group.

Effective utilization of this new and novel "flip-flop" type of power distribution allows the practical use of but a single Zener diode as the only switching element, rather than two back-to-back Zeners as in FIG. 1, or a bilateral silicon switch as in FIG. 2, still further lowering the manufacturing cost of the overall string which is extremely competitive in today's marketplace from a cost standpoint, and for the very first time makes it commercially practical to utilize only a single Zener diode as previously attempted by the Sanders, et al, '079 patent. From strictly a manufacturing cost standpoint, it is estimated that a single Zener diode would cost approximately 2.0 cents in mass quantities, that the cost of back-to-back Zener diodes would be approximately 2.3 cents each, and that the cost of the HS-10 bilateral silicon switch would be approximately 5.0 cents.

In summary, with either "back-to-back" Zener diodes or "half-and-half" single Zener diodes being used as filament shunts, there is but a very slight reduction in voltage thereafter applied across each of the remaining bulbs in the series string when a bulb becomes inoperative as a result of one of the various reasons previously set forth, whereas, when the bilateral silicon switch is used as the filament switch, there may is slight increase in voltage applied across each of the remaining bulbs in the series string when a bulb becomes inoperative for any of the reasons aforesaid. This being the case, substantially all of the bulbs can be inoperative before the entire string immediately burns out.

Various other similar types of voltage sensitive switches shown in Radio Shack Semiconductor Reference Guide, Archer Catalog #276-405 (1992) having similar characteristics as those mentioned above may be used with equal or substantially equal success, the actual choice being determined by the cost of the device and the type of use or operation intended.

Having so described and illustrated the principles of my invention in a preferred embodiment, it is intended, therefore, in the annexed claims, to cover all such changes and modifications as may fall within the scope and spirit of the following claims. For example, it should be quite obvious to one skilled in the art that other similar devices could be used with equal success and that different Zener voltage ratings would be used for different lamps or bulbs.

What is claimed as new and desired to be protected by Letters Patent of the United States is:

1. A series-wired light string, comprising:

a plurality of light bulbs including a plurality of flasher light bulbs that do not include an internal shunt;

a plurality of light sockets, each light socket of said plurality of light sockets adapted to receive at least one of said plurality of light bulbs; and a plurality of shunts, each shunt being electrically connected in parallel across a respective light socket to maintain the current passing through the light socket in both directions in the event that a light bulb is inoperative or is missing from the light socket;

wherein, during operation of said light string, said flasher light bulbs flash on and off at different rates and at different times to cause the light string to exhibit a twinkling effect.

2. A method of operating a series-wired light string comprising a plurality of light bulbs including a plurality of flasher light bulbs that do not include an internal shunt, a plurality of light sockets, each light socket adapted to receive at least one of said plurality of light bulbs, and a plurality of shunts, each shunt being electrically connected in parallel across a respective light socket to maintain the current passing through the light socket in both directions in the event that a light bulb becomes inoperative or is missing from the light socket, the method comprising coupling a supply voltage to said series-wired light string, whereby the shunts allow the series-wired light string to remain operative at all times regardless of whether any of said light bulbs are inoperative or missing;

wherein, during operation of said light string, said flasher light bulbs flash on and off at different rates and at different times to cause the light string to exhibit a twinkling effect.

* * * * *